UNITED STATES PATENT OFFICE.

LEVI HAAS, OF CHESTER, PENNSYLVANIA.

COMPOUND MATERIAL FOR THE MANUFACTURE OF SHEETS, BOARDS, BLOCKS, ARTIFICIAL WOOD, &c.

SPECIFICATION forming part of Letters Patent No. 300,464, dated June 17, 1884.

Application filed March 15, 1884. (No specimens.)

*To all whom it may concern:*

Be it known that I, LEVI HAAS, a citizen of the United States of America, residing at Chester, in the county of Delaware and State of Pennsylvania, have invented certain new and useful Improvements in Compound Material for the Manufacture of Sheets, Boards, Blocks, Artificial Wood, &c., of which the following is a specification.

My invention relates to an improved compound material designed for the manufacture therefrom of many articles ordinarily produced from lumber and metal, and for the production of bricks, ties, blocks, boards, sheets, &c., therefrom.

In the process of producing my compound material I take about eighty per cent. of wood or other equivalent material having a vegetable fiber, and combine therewith about twenty per cent. of scrap-leather and shoe waste; but in lieu of leather and shoe waste an equivalent percentage of shoddy waste and crude asbestus may be substituted. The component parts are ground, pulverized, or otherwise reduced to a fiber, the quality of which is thus made more or less fine to suit the character of the article or articles to be produced from the material or the use to which it is intended to be applied. This mass is then subjected to heat until the moisture is evaporated therefrom, and while subjected to heat it is mixed into a solution of prepared asphalt reduced to a suitable liquid consistency until the mass attains a stiff plastic condition, the asphalt having been first thoroughly blended with a suitable quantity of pitch, sulphur, whiting, crude asbestus, and litharge. The plastic mass thus produced may be compressed, molded, rolled, or otherwise formed or shaped into blocks, chairs, ties, bricks, sheets, or plates to take the place of wood, or molded into articles of various character for use.

My improved material thus compounded may be subjected to all the uses to which lumber is subjected by carpenters, and thus to a great extent supersede the use of lumber, and it may be painted and varnished also with equally beautifying and beneficial results, besides which it may be molded and otherwise fashioned into an infinite multitude of articles.

Having thus fully described my invention, what I claim, and desire to secure by Letters Patent, is—

1. A compound material composed of vegetable fiber, leather or shoddy waste, crude asbestus, litharge, and sulphur, pitch and whiting blended with thinned asphaltum, to supersede the use of lumber, metal, and other materials for the production of various useful articles for use and ornament, substantially as herein described.

2. The process of producing a compound material from vegetable fiber, leather or shoddy waste, crude asbestus, litharge, and thinned asphaltum, blended with sulphur, pitch, and whiting, substantially as described, and for the purpose set forth.

In testimony whereof I affix my signature in presence of two witnesses.

LEVI HAAS.

Witnesses:
CHAS. C. LARKIN,
BENJAMIN C. FOX.